US012687279B1

(12) United States Patent
Ding

(10) Patent No.: US 12,687,279 B1
(45) Date of Patent: Jul. 21, 2026

(54) ANIMAL-LIKE SOLAR GARDEN LAMP

(71) Applicant: SHENZHEN AOYIN LIGHTING CO., LTD., Shenzhen (CN)

(72) Inventor: Zhijie Ding, Shenzhen (CN)

(73) Assignee: SHENZHEN AOYIN LIGHTING CO., LTD., Shenzhen (CN)

( * ) Notice: Subject to any disclaimer, the term of this patent is extended or adjusted under 35 U.S.C. 154(b) by 0 days.

(21) Appl. No.: 19/212,750

(22) Filed: May 20, 2025

(30) Foreign Application Priority Data

Mar. 10, 2025 (CN) ......................... 202520407114.1

(51) Int. Cl.
*F21V 17/02* (2006.01)
*F21S 9/03* (2006.01)
*F21V 21/08* (2006.01)
*F21V 21/116* (2006.01)
*F21W 131/109* (2006.01)

(52) U.S. Cl.
CPC .............. *F21V 17/02* (2013.01); *F21S 9/032* (2013.01); *F21S 9/035* (2013.01); *F21V 21/0824* (2013.01); *F21V 21/116* (2013.01); *F21S 9/03* (2013.01); *F21W 2131/109* (2013.01)

(58) Field of Classification Search
CPC ....... F21S 9/035; F21S 9/032; F21V 21/0824; F21W 2131/10; F21W 2131/109
USPC .......................................................... 362/124
See application file for complete search history.

(56) References Cited

U.S. PATENT DOCUMENTS

| | | | | |
|---|---|---|---|---|
| 1,606,354 A * | 11/1926 | Fillion | F21S 6/005 446/72 |
| D980,491 S * | 3/2023 | Chen | D26/67 |
| D1,022,281 S * | 4/2024 | Ding | D26/98 |
| 2005/0248934 A1* | 11/2005 | Weiser | F21V 21/0824 362/183 |
| 2018/0202620 A1* | 7/2018 | Soofer | F21S 4/20 |
| 2019/0338902 A1* | 11/2019 | Zinsky | F21V 21/0824 |
| 2020/0173618 A1* | 6/2020 | Maguire | F21S 9/032 |

* cited by examiner

*Primary Examiner* — William N Harris

(57) ABSTRACT

An animal-like solar garden lamp relates to a technical field of garden lamps. The animal-like solar garden lamp includes an upper bionic housing. A lower bionic housing is fixed at a bottom of the upper bionic housing, and bionic swing members are disposed on both sides of the upper bionic housing. A support frame is inserted at a bottom of the lower bionic housing. A solar panel is disposed on one side of the support frame, and a lamp board is fixed on each bionic swing member. A swing mechanism is located between the upper bionic housing and the lower bionic housing and configured to drive the bionic swing members to swing. A fixing mechanism is located between the solar panel and the support frame and configured to fix the solar panel.

8 Claims, 7 Drawing Sheets

ANIMAL-LIKE SOLAR GARDEN LAMP

TECHNICAL FIELD

The present disclosure relates to the technical field of garden lamps, and specifically, to an animal-like solar garden lamp.

TECHNICAL BACKGROUND

Garden lamps are generally concentrated at squares at entrances and exits of landscape gardens and green spaces, traffic arteries, two sides of garden roads and intersections thereof, steps, bridges, peripheries of buildings, fountains, sculptures, parterres, lawn edges, and the like. The garden lamps have both a specific use function and a high ornamental value. Garden lamps have become indispensable elements for establishing gardens and are widely distributed in each corner of the gardens, thereby meeting rich character requirements. With unique artistic language and styles, the garden lamps create spatial atmospheres according to characteristics of light, thereby exerting beautiful and colorful artistic effects on the garden spaces. The garden lamps have various shapes, some of which are set to be shapes of animals.

Currently, common bionic animal-like lamps on the market are generally integrally cast, and their parts cannot swing, which are less interesting. In addition, due to large volumes of support frames and solar panels of the bionic animal-like lamps, large spaces are occupied during packaging and transportation, which is not conducive to transportation and packaging. Therefore, it is necessary to implement optimization of an animal-like solar garden lamp through technical innovation and design optimization.

SUMMARY

Currently, common bionic animal-like lamps on the market are generally integrally cast, and their parts cannot swing, which are less interesting. In addition, due to large volumes of support frames and solar panels of the bionic animal-like lamps, large spaces are occupied during packaging and transportation, which is not conducive to transportation and packaging. To resolve the foregoing problem, embodiments of this application provide an animal-like solar garden lamp. A motor drives two round plates and a fixing column to rotate, the fixing column drives two collars to move vertically, and in this case, an inserting column moves vertically along with the collars, a rotating column does not move, and then a bionic swing member is driven to swing through a connecting block, to simulate swing of a limb or wing of an animal, thereby making the garden lamp more interesting and attractive. In addition, a plug at a top of an upper steel pipe is pulled out from a socket, the upper steel pipe and a lower steel pipe are both pulled out from a connecting pipe, and then a pointed pipe is pulled out from a bottom of the lower steel pipe, to complete a disassembly function of a support frame, and then an upper protection housing is rotated around the bolt, which helps reduce a volume, thereby facilitating packaging and transportation.

Technical solutions adopted to resolve the technical problems in the embodiments of this application are as follows:

An animal-like solar garden lamp includes:

an upper bionic housing, where a lower bionic housing is fixed at a bottom of the upper bionic housing, bionic swing members are disposed on both sides of the upper bionic housing, a support frame is inserted at a bottom of the lower bionic housing, a solar panel is disposed on one side of the support frame, and a lamp board is fixed on each bionic swing member;

a swing mechanism, where the swing mechanism is located between the upper bionic housing and the lower bionic housing and configured to drive the bionic swing members to swing; and a fixing mechanism, where the fixing mechanism is located between the solar panel and the support frame and configured to fix the solar panel.

In a possible implementation, the support frame includes an upper steel pipe located at the bottom of the lower bionic housing, a lower steel pipe is disposed at the bottom of the upper steel pipe, a connecting pipe is disposed between the upper steel pipe and the lower steel pipe, a bottom end of the upper steel pipe is plugged into a top end of the connecting pipe, a top end of the lower steel pipe is plugged into a bottom end of the connecting pipe, and a bottom end of the lower steel pipe is plugged into a pointed pipe. A plug is fixed at the top of the upper steel pipe, a socket is fixed at the bottom of the lower bionic housing, and the plug can be inserted into the socket. The plug at the top of the upper steel pipe is pulled out from the socket, the upper steel pipe and the lower steel pipe are both pulled out from the connecting pipe, and then the pointed pipe is pulled out from the bottom of the lower steel pipe, to complete a disassembly function of the support frame, which helps reduce a volume, thereby facilitating packaging and transportation.

In a possible implementation, the swing mechanism includes a drive portion fixed between the upper bionic housing and the lower bionic housing, a swing portion is rotated between the upper bionic housing and the lower bionic housing, and the drive portion can drive the swing portion to move. The drive portion includes a motor fixed on the lower bionic housing, two round plates are disposed on one side of the motor, a fixing column is fixed between the two round plates, two collars are sleeved over the fixing column, slots are disposed on both collars, an output terminal of the motor is fixedly connected to one round plate, and the other round plate is rotatably connected to the lower bionic housing. The swing portion includes a rotating column that can be rotated between the lower bionic housing and the upper bionic housing, an inserting column is fixed on one side, closer to the collar, of the rotating column, the inserting column can be inserted into the slot, and a connecting block is fixed on the other side of the rotating column. A cylindrical groove is disposed in the connecting block, a circular cylinder is fixed on each bionic swing member, and the circular cylinder can be inserted into the cylindrical groove. The motor drives the two round plates and the fixing column to rotate, the fixing column drives the two collars to move vertically, and in this case, the inserting column moves vertically along with the collars, the rotating column does not move, and then each bionic swing member is driven to swing through the connecting block, to simulate swing of a limb or wing of the animal, thereby making the garden lamp more interesting and attractive.

In a possible implementation, the fixing mechanism includes an upper protection housing fixed at a bottom of the solar panel, a lower protection housing is fixed at a bottom of the upper protection housing, a battery is disposed between the upper protection housing and the lower protection housing, a through hole is opened in the upper protection housing, a circular hole is opened in the connecting pipe, a bolt is inserted into the circular hole and the through hole, and one end of the bolt is threadedly connected to a locking block. The circular hole is aligned with the through hole, the bolt passes through the circular hole and the through hole, the locking block is rotated simultaneously to restrain the bolt, and the upper protection housing is rotated upward to fold and store the solar panel, which facilitates transportation and packaging.

In conclusion, the present disclosure has at least one of the following beneficial technical effects:

1. The motor drives the two round plates and the fixing column to rotate, the fixing column drives the two collars to move vertically, and in this case, the inserting column moves vertically along with the collars, the rotating column does not move, and then each bionic swing member is driven to swing through the connecting block, to simulate swing of the limb or wing of the animal, thereby making the garden lamp more interesting and attractive.
2. The plug at the top of the upper steel pipe is pulled out from the socket, the upper steel pipe and the lower steel pipe are both pulled out from the connecting pipe, and then the pointed pipe is pulled out from the bottom of the lower steel pipe, to complete the disassembly function of the support frame, and then the locking block is removed from the bolt and the bolt is removed from the circular hole and through hole, so that the solar panel can be removed, which helps reduce a volume, thereby facilitating packaging and transportation.

REFERENCE SIGNS

1. upper bionic housing; 2. bionic swing member; 3. lamp board; 4. rotating column; 5. motor; 6. lower bionic housing; 7. inserting column; 8. plug; 9. upper steel pipe; 10. locking block; 11. connecting pipe; 12. bolt; 13. lower steel pipe; 14. pointed pipe; 15. lower protection housing; 16. battery; 17. upper protection housing; 18. solar panel; 19. connecting block; 20. round plate; 21. collar; 22. slot; 23. fixing column; 24. circular cylinder; and 25. cylindrical groove.

DETAILED DESCRIPTION OF EMBODIMENTS

Technical solutions in the present disclosure are clearly and completely described below with reference to accompanying drawings in the present disclosure. In addition, shapes of structures described in the following embodiments are merely exemplary, and a device related to the present disclosure is not limited to the structures described in the following embodiments. All other embodiments obtained by persons of ordinary skills in the art without creative efforts shall fall within the protection scope of the present disclosure.

Figure 1:
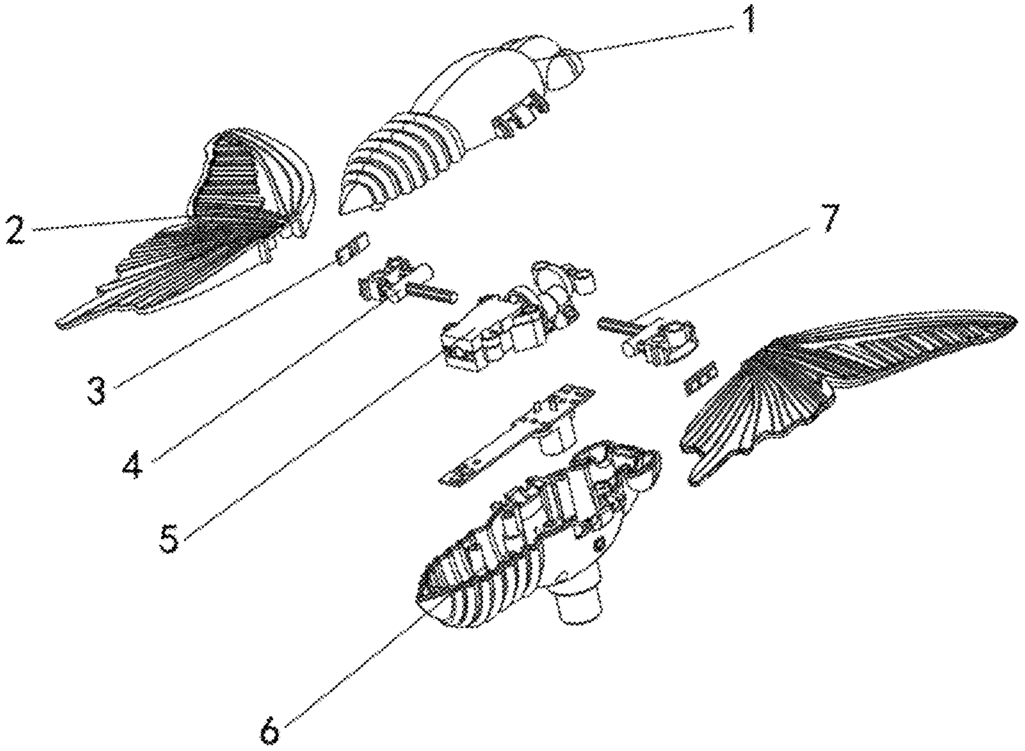
FIG. 1 is an exploded schematic view of a partial structure according to the present disclosure.
Figure 2:
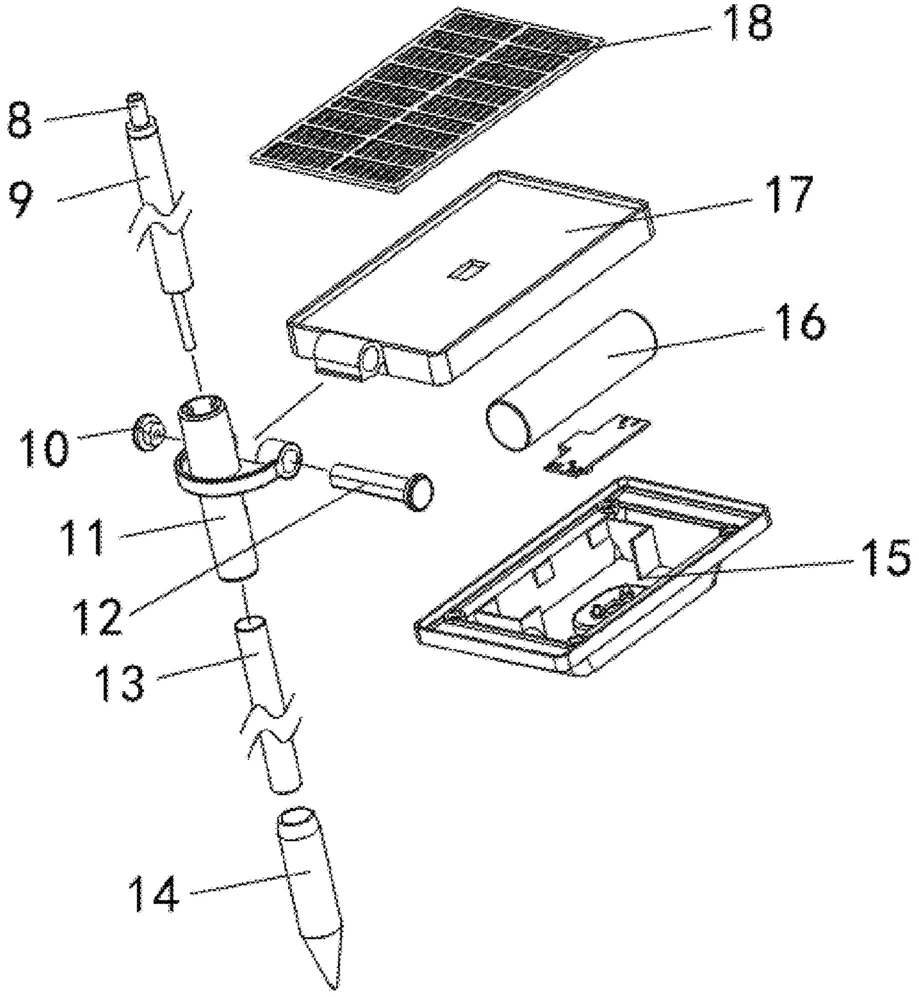
FIG. 2 is an exploded schematic view of other structures according to the present disclosure.
Figure 3:
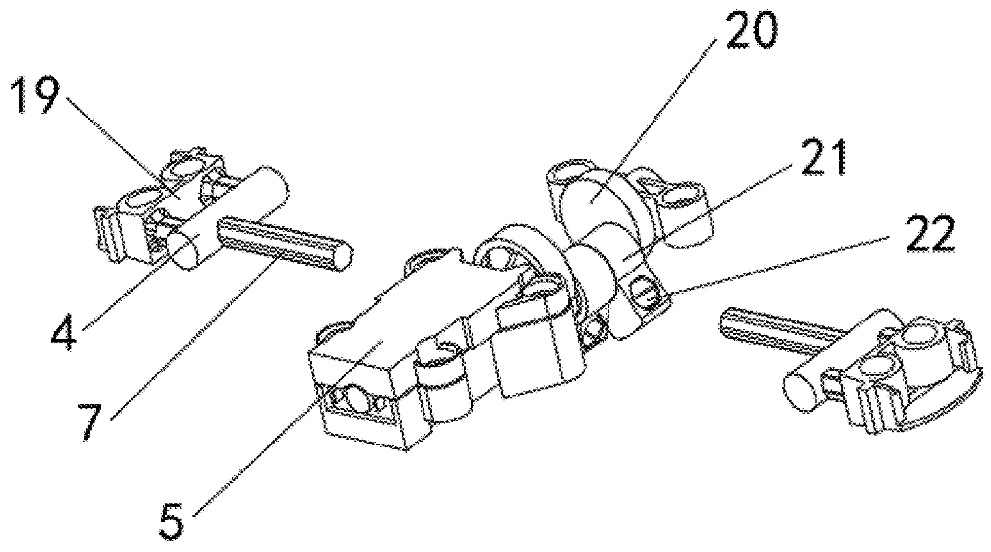
FIG. 3 is a schematic structural diagram of a drive portion and a swing portion according to the present disclosure.
Figure 4:
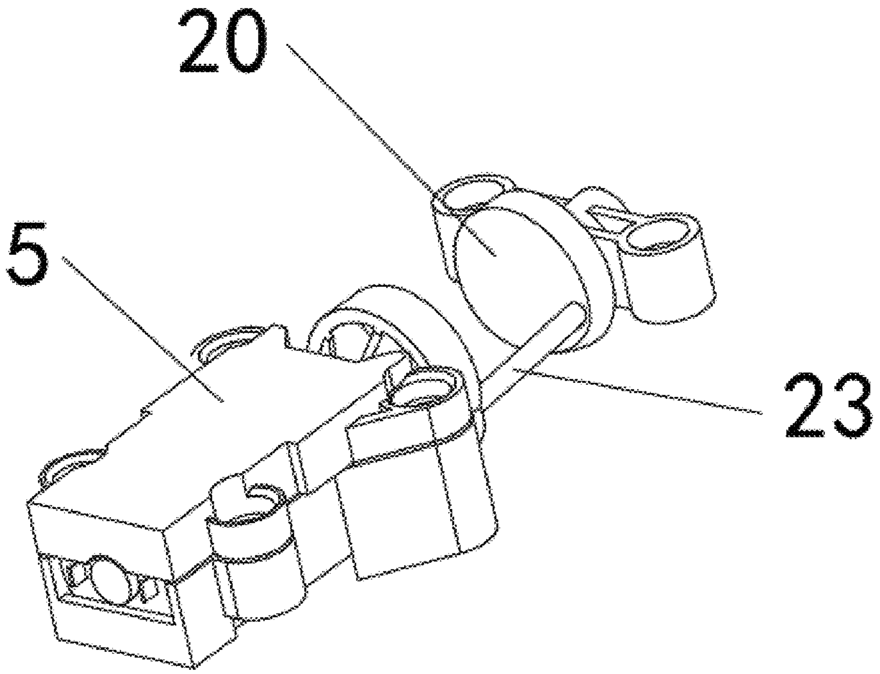
FIG. 4 is a schematic structural diagram of a drive portion with a collar removed according to the present disclosure.
Figure 5:
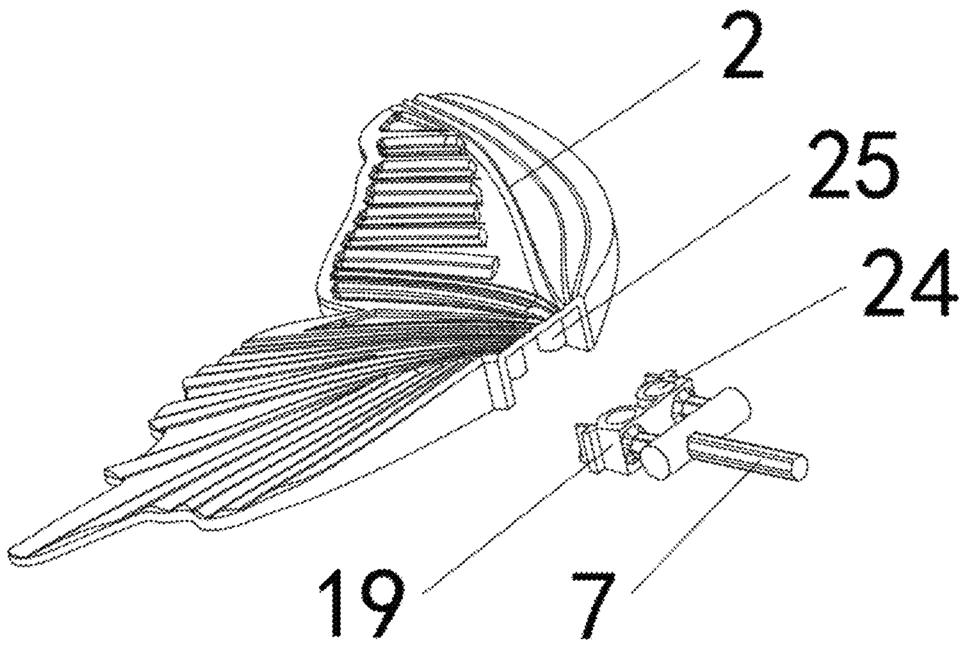
FIG. 5 is a schematic structural diagram of a bionic swing member and a swing portion according to the present disclosure.
Figure 6:
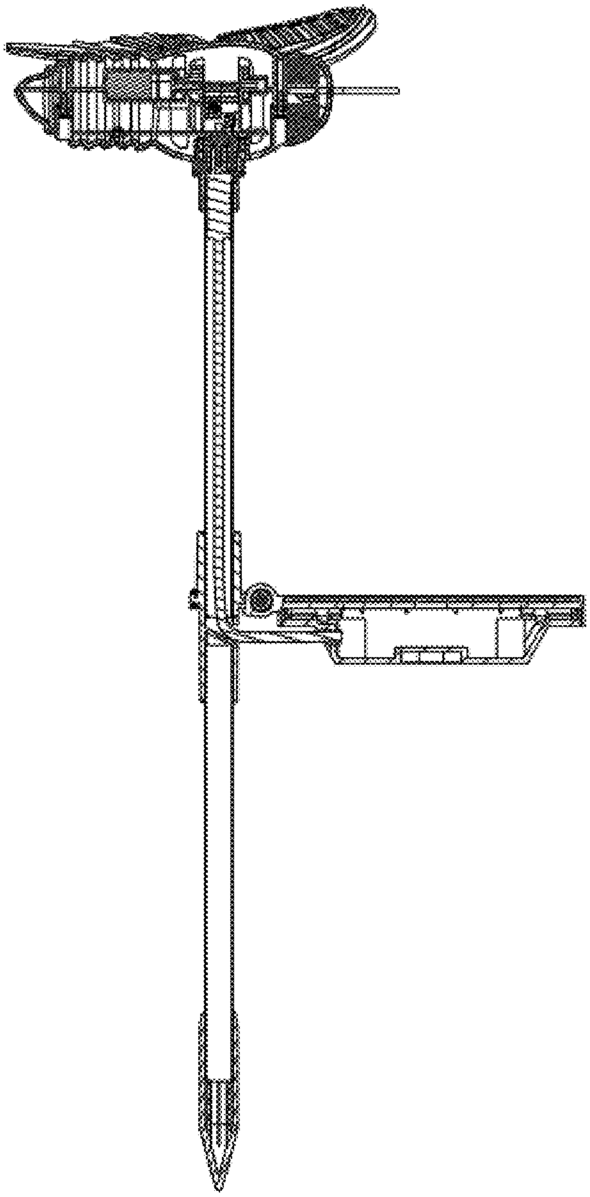
FIG. 6 is a schematic diagram of a lateral cross-section of an overall structure according to the present disclosure.
Figure 7:
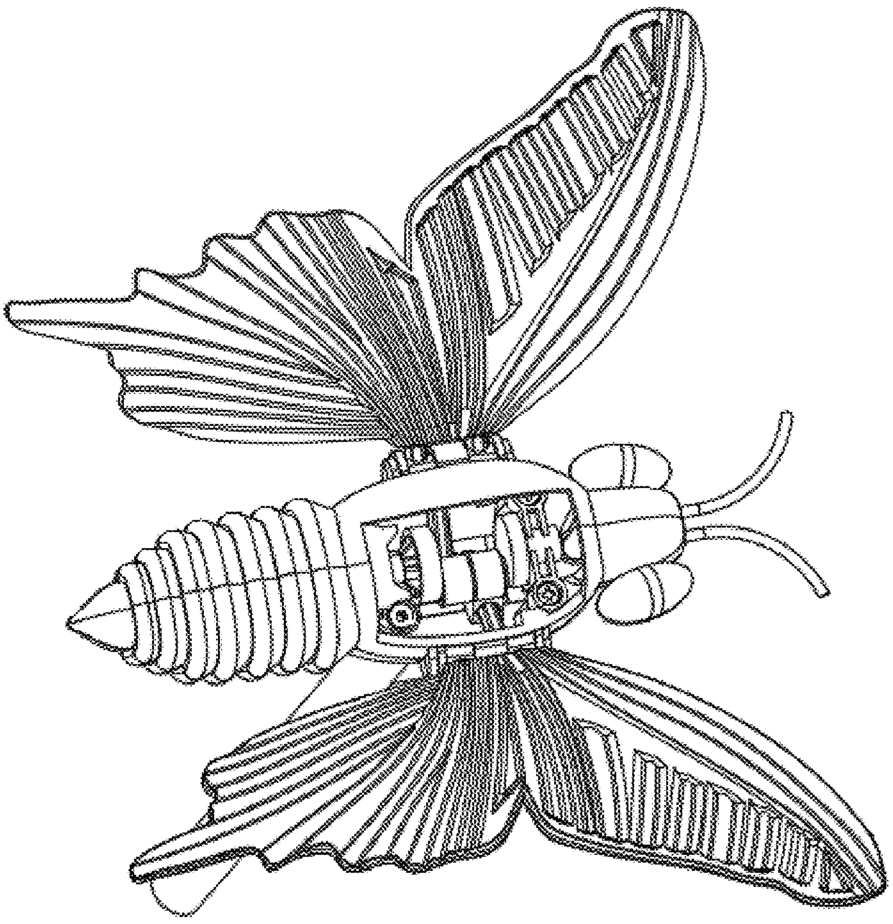
FIG. 7 is a partial cross-sectional view of an overall structure according to the present disclosure.

This embodiment introduces a specific structure of an animal-like solar garden lamp. Specifically, referring to FIG. 1 to FIG. 7, the animal-like solar garden lamp includes:

- an upper bionic housing 1, where a lower bionic housing 6 is fixed at a bottom of the upper bionic housing 1, bionic swing members 2 are disposed on both sides of the upper bionic housing 1, a support frame is inserted at a bottom of the lower bionic housing 6, a solar panel 18 is disposed on one side of the support frame, and a lamp board 3 is fixed on each bionic swing member 2;
- a swing mechanism, where the swing mechanism is located between the upper bionic housing 1 and the lower bionic housing 6 and configured to drive the bionic swing members 2 to swing; and
- a fixing mechanism, where the fixing mechanism is located between the solar panel 18 and the support frame and configured to fix the solar panel 18.

Due to large volumes of a support frame and a solar panel 18, a large space is occupied during packaging and transportation, which is not conducive to transportation and packaging.

Therefore, the support frame includes an upper steel pipe 9 located at the bottom of the lower bionic housing 6, a lower steel pipe 13 is disposed at the bottom of the upper steel pipe 9, a connecting pipe 11 is disposed between the upper steel pipe 9 and the lower steel pipe 13, a bottom end of the upper steel pipe 9 is plugged into a top end of the connecting pipe 11, a top end of the lower steel pipe 13 is plugged into a bottom end of the connecting pipe 11, and a bottom end of the lower steel pipe 13 is plugged into a pointed pipe 14. A plug 8 is fixed at the top of the upper steel pipe 9, a socket is fixed at the bottom of the lower bionic housing 6, and the plug 8 can be inserted into the socket. The plug 8 at the top of the upper steel pipe 9 is pulled out from the socket, the upper steel pipe 9 and the lower steel pipe 13 are both pulled out from the connecting pipe 11, and then the pointed pipe 14 is pulled out from the bottom of the lower steel pipe 13, to complete a disassembly function of the support frame, which helps reduce a volume, thereby facilitating packaging and transportation.

In addition, the fixing mechanism includes an upper protection housing 17 fixed at a bottom of the solar panel 18, a lower protection housing 15 is fixed at a bottom of the upper protection housing 17, a battery 16 is disposed between the upper protection housing 17 and the lower protection housing 15, a through hole is opened in the upper protection housing 17, a circular hole is opened in the connecting pipe 11, a bolt 12 is inserted into the circular hole and the through hole, and one end of the bolt 12 is threadedly connected to a locking block 10. The circular hole is aligned with the through hole, the bolt 12 passes through the circular hole and the through hole, the locking block 10 is rotated simultaneously to restrain the bolt 12, and the upper protection housing 17 is rotated upward to fold and store the solar panel 18, which facilitates transportation and packaging.

Currently, common bionic animal-like lamps on the market are generally integrally cast, and their parts cannot swing.

Therefore, the swing mechanism includes a drive portion fixed between the upper bionic housing 1 and the lower bionic housing 6, a swing portion is rotated between the upper bionic housing 1 and the lower bionic housing 6, and the drive portion can drive the swing portion to move. The drive portion includes a motor 5 fixed on the lower bionic housing 6, two round plates 20 are disposed on one side of the motor 5, a fixing column 23 is fixed between the two round plates 20, two collars 21 are sleeved over the fixing column 23, slots 22 are disposed on both collars 21, an output terminal of the motor 5 is fixedly connected to one round plate 20, and the other round plate 20 is rotatably connected to the lower bionic housing 6. The swing portion includes a rotating column 4 that can be rotated between the lower bionic housing 6 and the upper bionic housing 1, an inserting column 7 is fixed on one side, closer to the collar 21, of the rotating column 4, the inserting column 7 can be inserted into the slot 22, and a connecting block 19 is fixed on the other side of the rotating column 4. A cylindrical groove 25 is disposed in the connecting block 19, a circular cylinder 24 is fixed on each bionic swing member 2, and the circular cylinder 24 can be inserted into the cylindrical groove 25. The motor 5 drives the two round plates 20 and the fixing column 23 to rotate, the fixing column 23 drives the two collars 21 to move vertically, and in this case, the inserting column 7 moves vertically along with the collars 21, the rotating column 4 does not move, and then each bionic swing member 2 is driven to swing through the connecting block 19, to simulate swing of a limb or wing of the animal, thereby making the garden lamp more interesting and attractive.

When the staff need to package and transport the garden lamp, the plug 8 at the top of the upper steel pipe 9 is pulled out from the socket, the upper steel pipe 9 and the lower steel pipe 13 are both pulled out from the connecting pipe 11, and then the pointed pipe 14 is pulled out from the bottom of the lower steel pipe 13, to complete a disassembly function of the support frame, and then the upper protection housing 17 is rotated around the bolt 12, which helps reduce a volume, thereby facilitating packaging and transportation. During working, the motor 5 drives the two round plates 20 and the fixing column 23 to rotate, the fixing column 23 drives the two collars 21 to move vertically, and in this case, the inserting column 7 moves vertically along with the collars 21, the rotating column 4 does not move, and then each bionic swing member 2 is driven to swing through the connecting block 19, to simulate swing of a limb or wing of the animal, thereby making the garden lamp more interesting and attractive.

Finally, it should be noted that, obviously, the above embodiments are only examples for clearly describing the present disclosure, and are not limitations on the embodiments. For persons of ordinary skills in the art, other changes or modifications in different forms may also be made on the basis of the above descriptions. It is unnecessary and impossible to exhaust all embodiments. Obvious changes or modifications derived therefrom shall still fall within the protection scope of the present disclosure.

What is claimed is:

1. An animal-like solar garden lamp, comprising:

an upper bionic housing (1), wherein a lower bionic housing (6) is fixed at a bottom of the upper bionic housing (1), bionic swing members (2) are disposed on both sides of the upper bionic housing (1), a support frame is inserted at a bottom of the lower bionic housing (6), a solar panel (18) is disposed on one side of the support frame, and a lamp board (3) is fixed on each bionic swing member (2);

a swing mechanism, wherein the swing mechanism is located between the upper bionic housing (1) and the lower bionic housing (6) and configured to drive the bionic swing members (2) to swing; and a fixing mechanism, wherein the fixing mechanism is located between the solar panel (18) and the support frame and configured to fix the solar panel (18).

2. The animal-like solar garden lamp according to claim 1, wherein the support frame comprises an upper steel pipe (9) located at the bottom of the lower bionic housing (6), a lower steel pipe (13) is disposed at a bottom of the upper steel pipe (9), a connecting pipe (11) is disposed between the upper steel pipe (9) and the lower steel pipe (13), a bottom end of the upper steel pipe (9) is plugged into a top end of the connecting pipe (11), a top end of the lower steel pipe (13) is plugged into a bottom end of the connecting pipe (11), and a bottom end of the lower steel pipe (13) is plugged into a pointed pipe (14).

3. The animal-like solar garden lamp according to claim 2, wherein a plug (8) is fixed at a top of the upper steel pipe (9), a socket is fixed at the bottom of the lower bionic housing (6), and the plug (8) is inserted into the socket.

4. The animal-like solar garden lamp according to claim 1, wherein the swing mechanism comprises a drive portion fixed between the upper bionic housing (1) and the lower bionic housing (6), a swing portion is rotated between the upper bionic housing (1) and the lower bionic housing (6), and the drive portion is configured to drive the swing portion to move.

5. The animal-like solar garden lamp according to claim 4, wherein the drive portion comprises a motor (5) fixed on the lower bionic housing (6), two round plates (20) are disposed on one side of the motor (5), a fixing column (23) is fixed between the two round plates (20), two collars (21) are sleeved over the fixing column (23), slots (22) are disposed on both collars (21), an output terminal of the motor (5) is fixedly connected to one round plate (20), and the other round plate (20) is rotatably connected to the lower bionic housing (6).

6. The animal-like solar garden lamp according to claim 5, wherein the swing portion comprises a rotating column (4) that is rotatable between the lower bionic housing (6) and the upper bionic housing (1), an inserting column (7) is fixed on one side, closer to the collar (21), of the rotating column (4), the inserting column (7) is inserted into the slot (22), and a connecting block (19) is fixed on the other side of the rotating column (4).

7. The animal-like solar garden lamp according to claim 6, wherein a cylindrical groove (25) is disposed in the connecting block (19), a circular cylinder (24) is fixed on each bionic swing member (2), and the circular cylinder (24) is inserted into the cylindrical groove (25).

8. The animal-like solar garden lamp according to claim 2, wherein the fixing mechanism comprises an upper protection housing (17) fixed at a bottom of the solar panel (18), a lower protection housing (15) is fixed at a bottom of the upper protection housing (17), a battery (16) is disposed between the upper protection housing (17) and the lower protection housing (15), a through hole is opened in the upper protection housing (17), a circular hole is opened in the connecting pipe (11), a bolt (12) is inserted into the circular hole and the through hole, and one end of the bolt (12) is threadedly connected to a locking block (10).

* * * * *